UNITED STATES PATENT OFFICE.

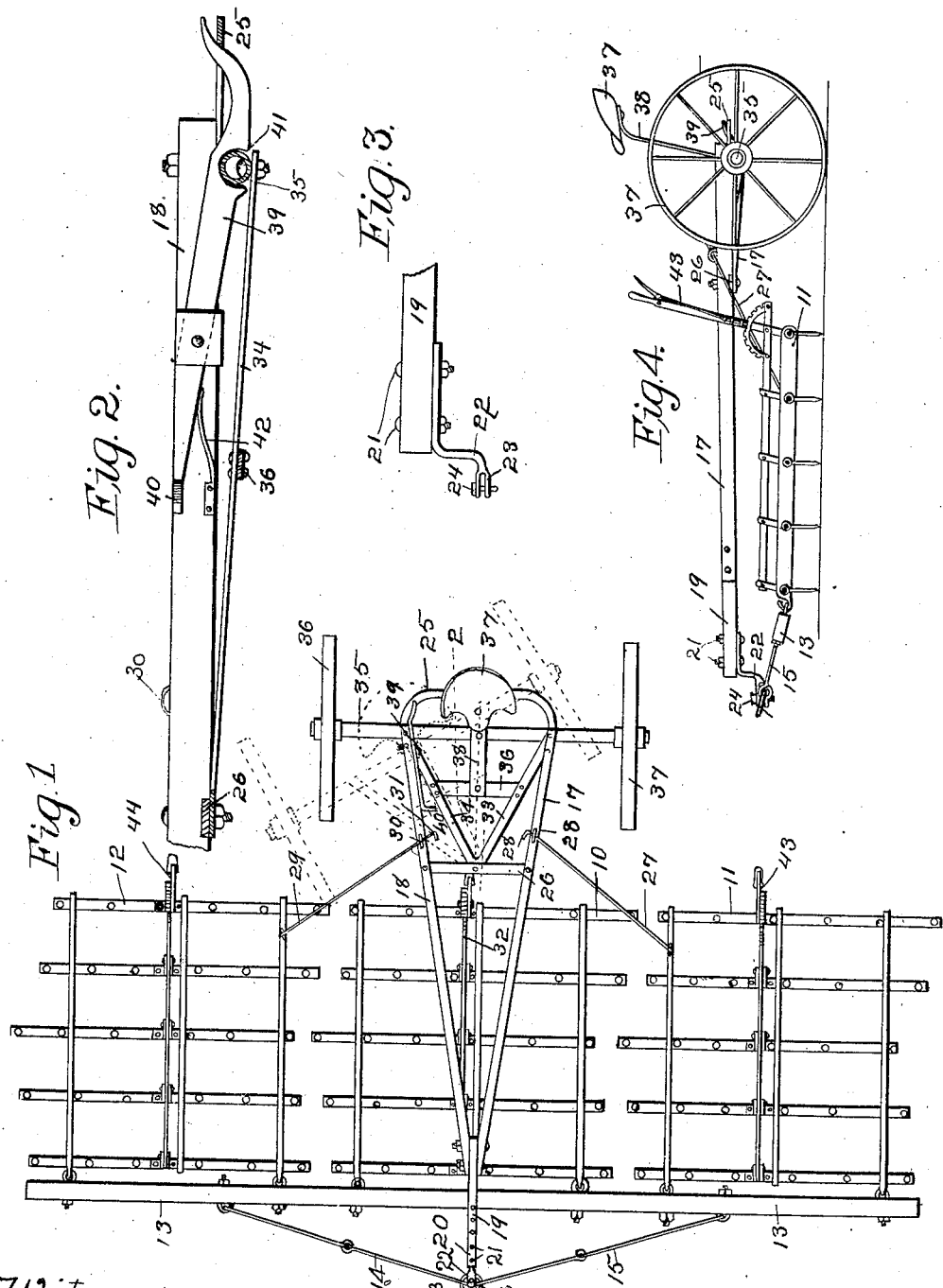

JOHN WILLIAM HARMON, OF CRESTON, IOWA.

DETACHABLE HARROW-CART.

No. 846,201.　　　　　Specification of Letters Patent.　　　　　Patented March 5, 1907.

Application filed July 31, 1905. Serial No. 271,970.

*To all whom it may concern:*

Be it known that I, JOHN WILLIAM HARMON, a citizen of the United States, residing at Creston, in the county of Union and State of Iowa, have invented a certain new and useful Detachable Harrow-Cart, of which the following is a specification.

The objects of my invention are to provide a harrow-cart which can be easily attached to or detached from the ordinary harrow and which is capable of adjustment relative to said harrow easily, and, further, to provide a cart of this class which swings readily with the motion of the harrow, and thus permits the harrow to operate freely and not be interfered with by the harrow-cart in its operation.

My invention consists in certain details in the construction, arrangement, and combination of the various parts of the device, whereby the objects contemplated are attained, as hereinafter more fully set forth, pointed out in my claims, and illustrated in the accompanying drawings, in which—
Figure 1 is a plan view of the complete harrow with the cart attached to it. Fig. 2 is a sectional view of the harrow-cart cut on the line 2 2 of Fig. 1 with the traction-wheel removed. Fig. 3 is a detail view of the device for attaching the cart to the harrow, and Fig. 4 is a side elevation of the complete machine.

Referring to the acccompanying drawings, I have used the reference-numerals 10, 11, and 12 to indicate the three sections of the harrow, the numeral 10 indicating the middle section and the numerals 11 and 12 indicating the outside sections. Attached to the front portion of these sections 10, 11, and 12 in the ordinary way is a draw-bar 13, to the side of which I have pivotally attached the rods 14 and 15, which are connected at their free ends by the ring 16, to which the doubletrees used in drawing the harrow are attached. To the ring 16 the harrow-cart, hereinafter described, is attached. The frame of the harrow-cart consists of two beams 17 and 18, between the forward ends of which I have secured the bar 19, in which there are a series of openings 20, designed to receive the bolts 21. Secured to the under surface of the bar 19 by means of the bolts 21 is a connecting-link 22, having the forked forward end 23, one part of which forked portion engages the lower side of the ring 16.
and the other side of the forked portion 23 engages the upper side of the ring when the cart is attached to the harrow, and a kingbolt 24 connects the forward ends of this forked portion 23 to maintain the ring 16 within it. This bolt can be easily removed at the pleasure of the operator.

Connecting the rear ends of the beams 17 and 18 is a curved track 25, which serves the double purpose of maintaining the rear ends of the beams 17 and 18 in position relative to each other, and the function of a track on which the axle of the harrow-cart slides in turning. Connecting the middle portions of the beams 17 and 18 is a cross-bar 26.

Pivotally attached to the harrow 11 is a hooked rod 27, which slides through the eye 28 on the beam 17. This hooked rod is so constructed that the beams 17 and 18 will be capable of movement toward the harrow 11 and yet will not be capable of moving beyond the hooked portion 28 toward the harrow 12.

Pivotally attached to the harrow 12 is the hooked rod 29, which slides through the eye 30 on the beam 18, which is so arranged that the beams 17 and 18 can move toward the harrow 12, but will be limited in its movement toward the harrow 11 by the hooks 31. Thus on account of the arrangement of the rods 27 and 29 the beams 17 and 18 will be allowed to move laterally slightly in either direction, but will be maintained against too great a longitudinal movement by these rods, and thus the lever 32, which is used for tilting the teeth of the harrow-section 10, will not be engaged by either of these beams 17 and 18 in the operation of the device. For this reason the lever can be easily operated at all times.

Pivotally attached to the central portion of the cross-bar 26 is a V-shaped frame having the side portions 33 and 34, which are attached at their rear ends to the axle 35, bearing the traction-wheels 36 and 37. Connecting the middle portions of the sides 33 and 34 of the V-shaped frame is the seat-supporting bar 36, having the seat 37 connected therewith by means of the support 38 in the ordinary way. This V-shaped frame, which is secured to the axle, is so arranged that the truck is capable of lateral movement when the lever 39 (hereinafter described) is released.

Pivotally attached to the inner rear portion of the beam 18 is the locking foot-lever 39, having the foot-piece 40 at its forward end, which lever is designed to maintain the beams 17 and 18 in position relative to the axle 35 when the locking-lever is in a locked position. In the rear portion of the locking-lever 39 is a curved opening 41, which is designed to receive the axle 35 when the locking-lever is in a locked position. Secured to the inside of the beam 18 and immediately beneath the foot-piece 40 is a spring 42, designed to normally hold the rear end of the locking-lever at its lower limit of movement and to maintain it in a locked position relative to the axle when in use, except when turning the harrow around at the end of the rows. On the harrow-section 11 there is a lever 43 for tilting the teeth in said section, and in the section 12 of the harrow there is a lever 44 for tilting the teeth in this section.

In practical use the harrow-cart may be easily attached to or detached from the harrow, and the operation of all of the parts of the harrow can be fully carried on when my harrow-cart is attached to the harrow, owing to its construction.

Having thus described my invention, what I claim, and desire to secure by Letters Patent of the United States therefor, is—

1. In a device of the class described, a pivotally-mounted frame, a curved track forming the rear end of the frame, a pivotally-mounted truck pivoted to the frame, and means for maintaining the truck in position relative to the frame.

2. In a device of the class described, a pivotally-mounted frame, a curved track forming the rear end of the frame, a pivotally-mounted truck pivoted to the frame, means for maintaining the truck in position relative to the frame, and means for securing the forward end of the frame to a doubletree.

3. In a device of the class described, a harrow having a number of sections therein, a draw-bar for connecting the sections of said harrow together, a frame pivotally and detachably secured to the draw-bar, and a truck capable of lateral movement relative to the line of advance of the frame.

4. In a device of the class described, a harrow having a number of sections therein, a draw-bar for connecting the sections of said harrow together, a frame pivotally and detachably secured to the draw-bar, a truck capable of lateral movement relative to the line of advance of the frame, and means for securing the frame to the outer sections of the harrow in such a way as to allow the frame to have a slight lateral movement.

5. In a device of the class described, a harrow having a number of sections therein, a draw-bar for connecting the sections of said harrow together, a frame pivotally and detachably secured to the draw-bar, a truck capable of lateral movement relative to the line of advance of the frame, means for securing the frame to the outer sections of the harrow in such a way as to allow the frame to have a slight lateral movement, and means for maintaining the truck in position relative to the frame.

6. In a device of the class described, a harrow having a number of sections therein, a draw-bar for connecting the sections of said harrow together, a frame pivotally and detachably secured to the draw-bar, a truck capable of lateral movement relative to the line of advance of the frame, means for securing the frame to the outer sections of the harrow in such a way as to allow the frame to have a slight lateral movement, and spring-actuated means for maintaining the truck in position relative to the frame, designed to be operated by foot-power.

JOHN WILLIAM HARMON.

Witnesses:
 Roy E. Burns,
 Joseph Swisher.